(12) United States Patent
Niemann (10) Patent No.: US 9,240,129 B1
(45) Date of Patent: Jan. 19, 2016

(54) NOTIFICATIONS AND LIVE UPDATES FOR BRAILLE DISPLAYS

(75) Inventor: Florian Niemann, Zurich (CH)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/461,090

(22) Filed: May 1, 2012

(51) Int. Cl.
G09B 21/00 (2006.01)

(52) U.S. Cl.
CPC .................... G09B 21/003 (2013.01)

(58) Field of Classification Search
CPC .. G09B 21/001; G09B 21/003; G09B 21/005; G09B 21/007
USPC ............... 116/17; 340/407.1, 407.2; 434/112, 434/113, 114
See application file for complete search history.

(56) References Cited

U.S. PATENT DOCUMENTS

| | | | |
|---|---|---|---|
| 3,880,269 A | | 4/1975 | Carbonneau |
| 6,278,441 B1 * | | 8/2001 | Gouzman et al. ............. 345/163 |
| 6,712,613 B2 * | | 3/2004 | Depta ............................ 434/114 |
| 6,987,467 B2 | | 1/2006 | Romeo et al. |
| 7,316,566 B2 * | | 1/2008 | Carro ............................ 434/113 |
| 7,673,241 B2 * | | 3/2010 | Sun et al. ....................... 715/729 |
| 7,908,557 B2 * | | 3/2011 | Schrepp et al. ................ 715/729 |
| 8,133,055 B2 * | | 3/2012 | Minnich et al. ............... 434/113 |
| 8,382,480 B2 * | | 2/2013 | Bucchieri ...................... 434/113 |
| 8,451,248 B1 * | | 5/2013 | Kim ............................... 345/173 |
| 2002/0003469 A1 * | | 1/2002 | Gupta ......................... 340/407.1 |
| 2002/0122053 A1 | | 9/2002 | Dutta et al. |
| 2005/0079472 A1 | | 4/2005 | Shimamura et al. |
| 2007/0254268 A1 * | | 11/2007 | Adachi et al. ................. 434/112 |
| 2008/0282150 A1 * | | 11/2008 | Erwin et al. ................... 715/255 |
| 2009/0104587 A1 | | 4/2009 | Fabrick et al. |
| 2009/0274505 A1 | | 11/2009 | Morgan et al. |
| 2010/0182242 A1 * | | 7/2010 | Fields et al. .................. 345/169 |
| 2011/0181444 A1 | | 7/2011 | Mauduit et al. |
| 2012/0315607 A1 * | | 12/2012 | Shin et al. ..................... 434/114 |

FOREIGN PATENT DOCUMENTS

WO   WO 9715036 A1 *  4/1997

* cited by examiner

*Primary Examiner* — Sam Yao
*Assistant Examiner* — Michael Humphrey
(74) *Attorney, Agent, or Firm* — McDermott Will & Emery LLP (57) ABSTRACT

Various systems, servers, methods, media, programs, and devices for providing a notification of a live event in an application to a braille display are provided. Content information of the application is transmitted to the braille display and displayed in a first display area of the braille display. The notification is transmitted to the braille display and displayed in a second display area of the braille display in response to detecting the live event for notifying a user of the braille display of the live event. The notification is transmitted independently of the content information without interrupting transmission of the content information.

13 Claims, 4 Drawing Sheets

NOTIFICATIONS AND LIVE UPDATES FOR BRAILLE DISPLAYS

BACKGROUND

1. Field of the Disclosure

The present disclosure generally relates to the field of braille displays, and, in particular, to braille displays for displaying content of interactive applications.

2. Background Information

Computers have become a fixture in nearly all aspects of society. They serve an important role in business and are a vital source of both information and entertainment. An individual with a physical or visual impairment may use a braille display to read and interpret content displayed on a computer screen by a computer.

A typical braille display comprises a row of braille cells for displaying the content displayed on the computer screen. Each of the braille cells generally represents a single character. In this regard, a typical braille display is optimally configured for displaying content which is presented on a command line interface, which merely consists of text and characters. The command line interface is easily mapped to the braille display.

Modern computers, however, provide rich and dynamic graphical user interfaces, which are not as easily mapped to the braille display. As a result, new and improved braille displays are desired.

SUMMARY OF THE DISCLOSURE

The present disclosure, through one or more of its various aspects, embodiments, and/or specific features or sub-components, provides various systems, servers, methods, media, programs, and devices for providing improved braille displays.

In one embodiment of the present disclosure, a computer-implemented method for providing event notification to braille displays. The method transmits, using one or more computing devices, content information of an application to a braille display for displaying the content information by the braille display. The method detects, using the one or more computing devices, an event in the application, and transmits, using the one or more computing devices, the notification of the event to the braille display device independently of the content information without interrupting transmission of the content information in response to the one or more computing devices detecting the event for notifying of the event while displaying the content information by the braille display.

According to one aspect of the present disclosure, the content information is configured to be displayed in a first display area of the braille display, and the notification is configured to be displayed in a second display area of the braille display.

According to another aspect of the present disclosure, the computer-implemented method further receives a request from the braille display for event information of the event after transmitting the notification of the event to the braille display, and transmits the event information to the braille display while interrupting the transmission of the content information at least in part based on receiving the request from the braille display for the event information. The event information is configured to be displayed by the braille display in the first display area of the braille display.

According to yet another aspect of the present disclosure, the computer-implemented method further transmits the notification to the braille display for each of a plurality of events detected in the application, and stores event information of each of the plurality of events detected in the application in a queue.

According to an additional aspect of the present disclosure, the computer-implemented method further receives a request from the braille display for the event information of a first event of the plurality of events stored in the queue after transmitting the notification of the first event to the braille display, and transmits the event information of the first event to the braille display while interrupting the transmission of the content information in response to receiving the request from the braille display for the event information of the first event. The event information is configured to be displayed by the braille display in the first display area of the braille display. The computer-implemented method automatically transmits the event information of a second event of the plurality of events stored in the queue to the braille display while interrupting the transmission of the content information after transmitting the event information of the first event to the braille display.

According to another aspect of the present disclosure, the computer-implemented method further receives a request from the braille display for the event information of a first event of the plurality of events stored in the queue after transmitting the notification of the first event to the braille display, and transmits the event information of the first event to the braille display while interrupting the transmission of the content information in response to receiving the request from the braille display for the event information of the first event. The event information is configured to be displayed by the braille display in the first display area of the braille display. The computer-implemented method resumes the transmission of the content information to the braille display after transmitting the event information of the first event to the braille display.

According to yet another aspect of the present disclosure, the notification is representative of the event.

According to still another aspect of the present disclosure, the braille display comprises a plurality of braille cells and the second display area includes at least one of the braille cells.

According to an additional aspect of the present disclosure, the braille display comprises a plurality of braille cells and a notification area different than the plurality of braille cells, the first display area includes the plurality of braille cells, and the second display area includes the notification area.

According to another aspect of the present disclosure, the notification is configured to be passively displayed by the braille display.

According to yet another aspect of the present disclosure, the computer-implemented method further transmits event information of the event to the braille display in response to the transmission of the content information being inactive for a predetermined period of time. The event information is configured to be displayed in the first display area of the braille display.

According to an additional aspect of the present disclosure, the application includes at least one live region, and the event is detected as an update in the at least one live region.

According to another embodiment of the present disclosure, a non-transitory computer-readable medium including an executable program is provided. The executable program provides a notification of an event in an application to a braille display. The executable program causes a computer to transmit content information of the application to the braille display for displaying the content information by the braille display. The executable program further causes the computer to detect the event in the application, and transmit the notification of the event to the braille display device independently of the content information without interrupting transmission of the content information in response to detecting the event for notifying of the event while displaying the content information by the braille display.

According to one aspect of the present disclosure, the content information is configured to be displayed in a first display area of the braille display, and the notification is configured to be displayed in a second display area of the braille display different than the first display area.

According to another aspect of the present disclosure, the braille display comprises a plurality of braille cells and the executable program further causes the computer to further execute updating firmware of the braille display for allocating at least one of the plurality of braille cells as the second display area and defining others of the plurality of braille cells as the first display area.

According to yet another aspect of the present disclosure, the executable program further causes the computer to execute importing an application programming interface of the application. The event in the application is detected based on the application programming interface.

According to a further embodiment of the present disclosure, a server is provided. The server provides a notification of an event in an application to a braille display. The server includes a processor configured to detect an event in the application. The server further includes an interface configured to transmit content information of the application to the braille display for displaying the content information by the braille display. The content information is configured to be displayed in a first display area of the braille display. The interface is also configured to transmit the notification of the event to the braille display device independently of the content information without interrupting transmission of the content information in response to the processor detecting the event for notifying of the event while displaying the content information by the braille display. The notification is configured to be displayed in a second display area of the braille display different than the first display area.

According to one aspect of the present disclosure, the server further includes a memory that is configured to store event information of the event in response to the processor detecting the event, and a receiver that is configured to receive a request from the braille display for the event information of the event after transmitting the notification of the event to the braille display. The interface is configured to transmit the event information of the event to the braille display while interrupting the transmission of the content information in response to the receiver receiving the request from the braille display for the event information. The event information is configured to be displayed in the first display area of the braille display.

According to another aspect of the present disclosure, the interface is configured to transmit event information of the event to the braille display in response to the transmission of the content information being inactive for a predetermined period of time.

According to yet another embodiment of the present disclosure, a braille display device is provided. The braille display device provides a notification of an event in an application. The braille display includes an interface configured to receive content information of the application and the notification of the event in the application, a first display area comprising a plurality of braille cells and configured to display the content information of the application, and a second display area comprising at least one braille cell and configured to display the notification of the event in the application. The interface receives the notification independently of the content information and the second display area displays the notification without interrupting reception of the content information.

According to one aspect of the present disclosure, event information of the event is displayed in the first display area in response to a request for the event information being received.

According to another aspect of the present disclosure, event information of the event is displayed in the first display area in response to the interface being inactive for a predetermined period of time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
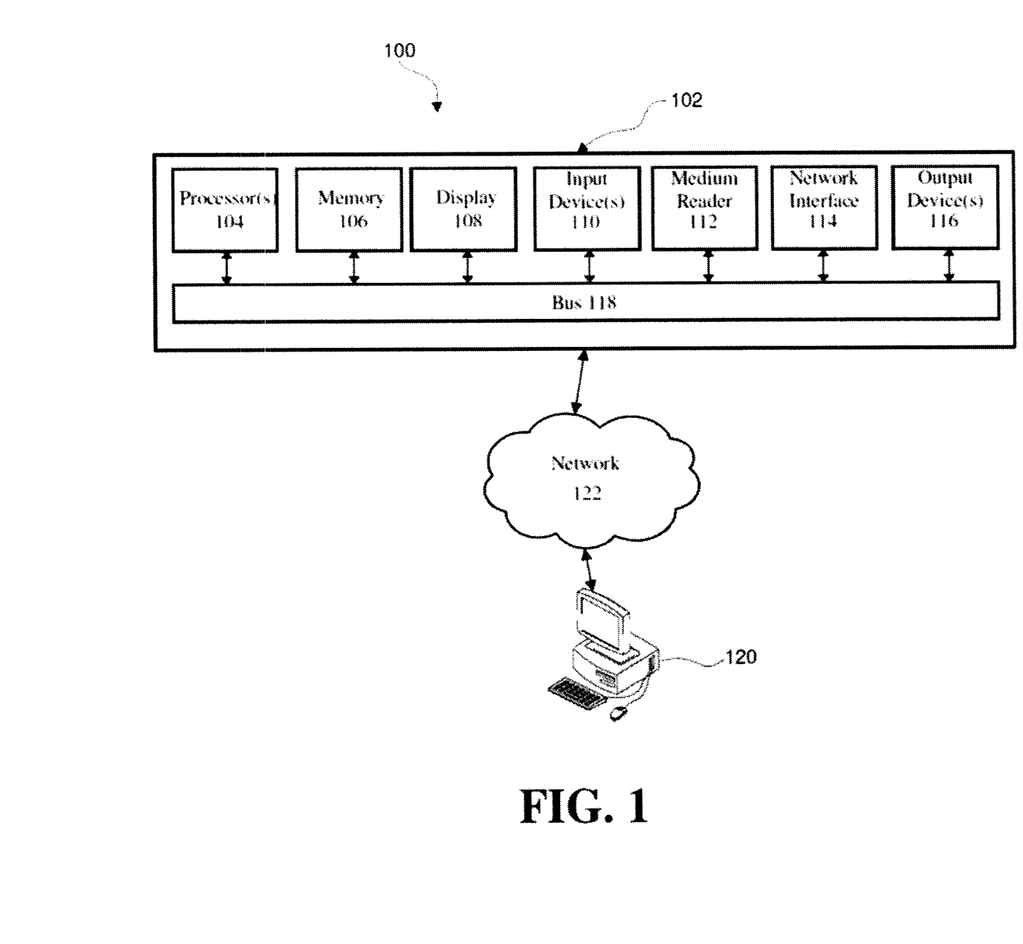
FIG. 1 illustrates a schematic of an exemplary system for providing a notification of an event in an application to a braille display.

FIG. 1 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, a television with one or more processors embedded therein and/or coupled thereto, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, a television with one or more processors embedded therein and/or coupled thereto, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
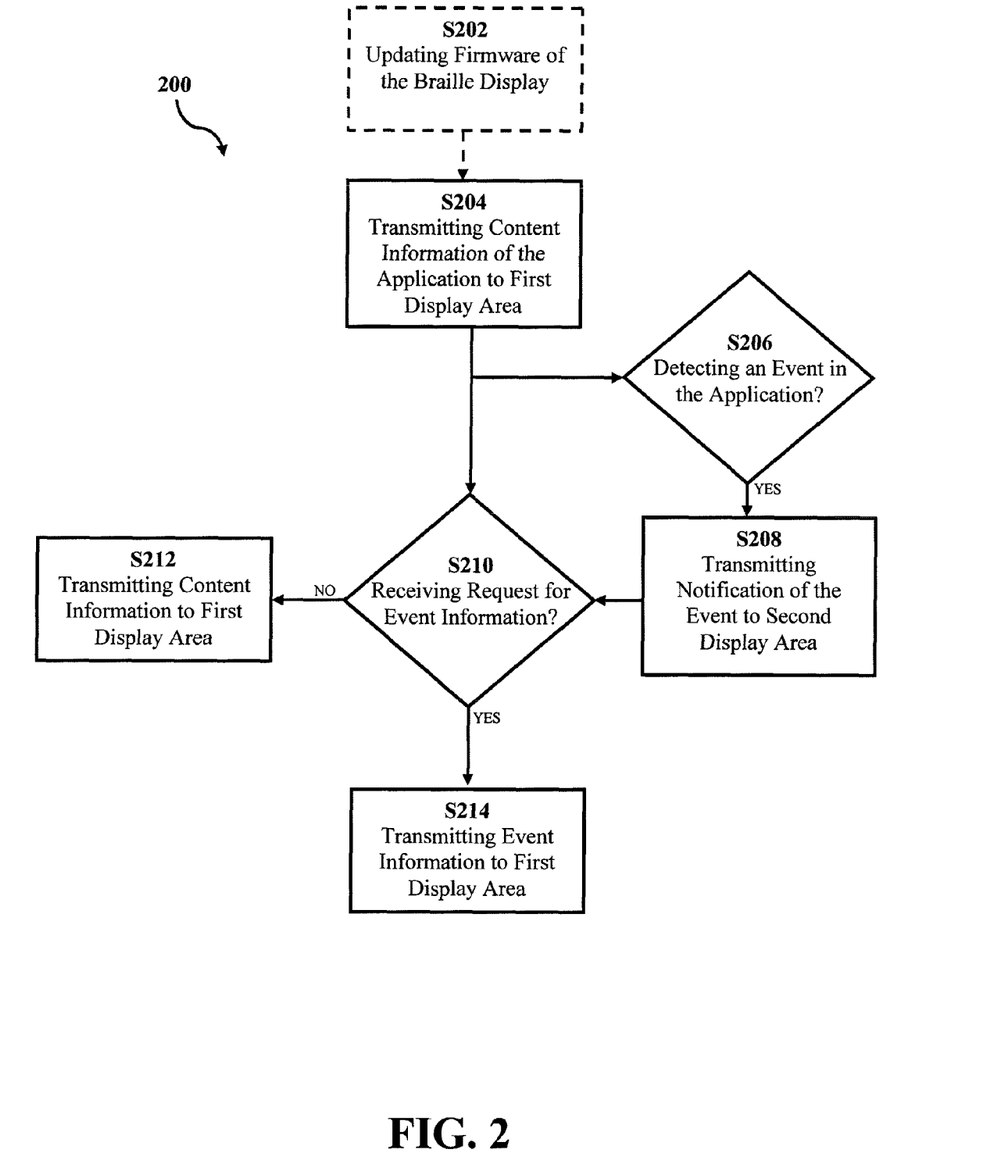
FIG. 2 illustrates an embodiment of a computer-implemented method for providing a notification of an event in an application to a braille display.

An exemplary embodiment of a computer-implemented method for providing a notification of an event in an application to a braille display is generally shown at 200 in FIG. 2.

The application may be any computer program or software application which is executable or displayable by a computer or computing device, such as the computer system 102 as shown in FIG. 1. The application may be stored and executed locally by the computer or computing device, or the application may be executed remotely by the computer or computing device. For example, in a non-limiting and exemplary embodiment of the present disclosure, the computer system 102 may execute the application over the network 122. The application may be, but is not limited to, an internet browser, word processing program, calendar application, social networking application, or any other program, application, or software which is executable or displayable by a computer or computing device. Of course, those skilled in the art appreciate that the above-described examples are merely exemplary and are not meant to be limiting in any way.

Figure 3:
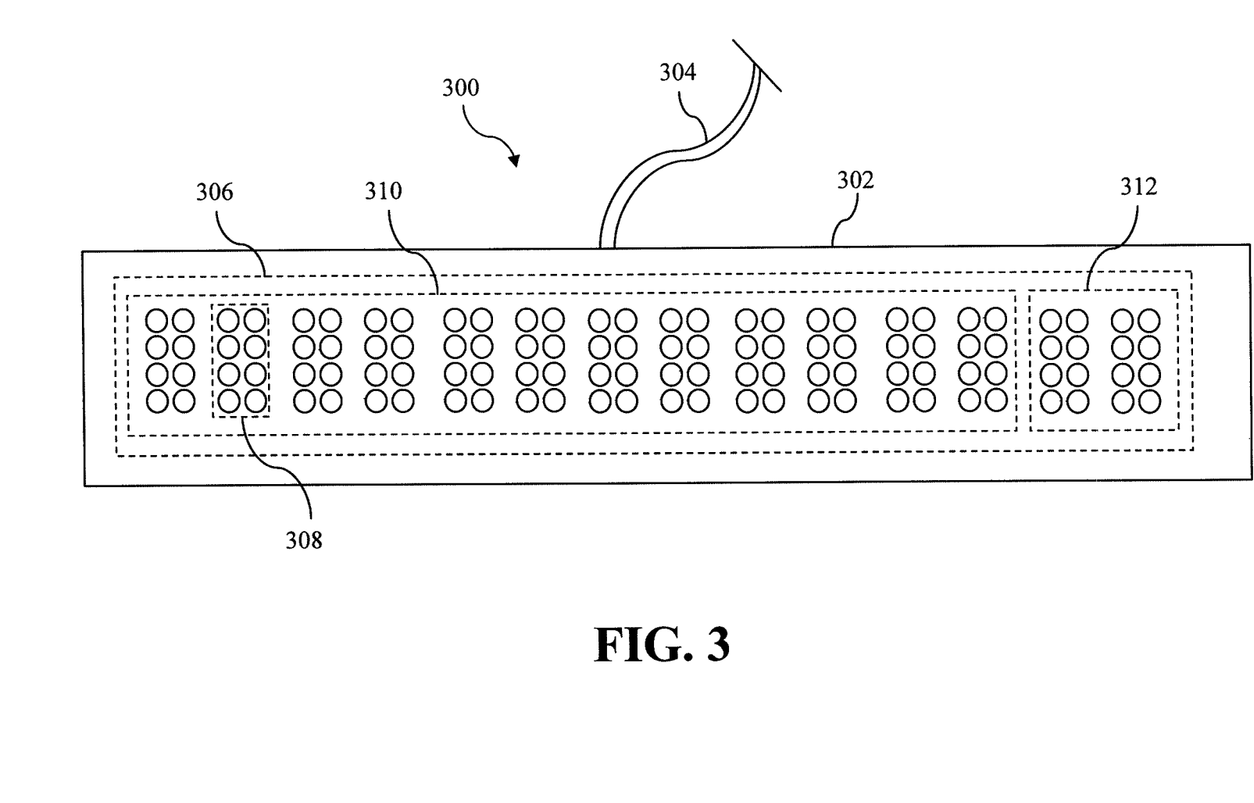
FIG. 3 illustrates an exemplary embodiment of a braille display for providing a notification of an event in an application to a braille display.

An exemplary braille display is generally shown at 300 in FIG. 3. The braille display 300 includes a body 302 and an interface 304. The interface 304 is connectable to the computer or computing device for sending and receiving information to and from the computer or computing device. The interface 304 is shown in FIG. 3 as being a wired interface; however, those skilled in the art appreciate that the interface 304 may also be a wireless interface.

The braille display 300 includes a display area 306 for displaying braille code. The display area 306 may comprise a plurality of braille cells 308 for displaying the braille code. The braille cells 308 may be aligned in a single row as shown in FIG. 3. In additional or alternative embodiments of the present disclosure, the braille cells 308 may be arranged in a circle or configured in any other pattern or arrangement. The braille cells 308 may include eight pins, as shown in FIG. 3, for displaying 8-*dot* code, six pins for displaying 6-*dot* code, or any combination thereof. Moreover, while the braille cells 308 are described as including pins, those skilled in the art appreciate that the braille cells 308 may include additional or alternative structures that are well known in the art for displaying braille code.

While not shown in FIG. 3, the braille display 300 may also include a processor, memory, display, input, output, or any combination thereof. For example, the braille display 300 may include a track-pad input, touchscreen input, or scroll wheel. In this regard, those skilled in the art appreciate that any braille display may be used without departing from the scope of the present disclosure. The braille display 300 may be a peripheral device for the computer or computing device, or the braille display may be a stand-alone computer or computing device in-and-of-itself. In this regard, in an embodiment of the present disclosure, the braille display 300 may include a memory and a processor which run and store the application.

The display area 306 of the braille display 300 includes a first display area 310 and a second display area 312. The second display area 312 of FIG. 3 is shown as including two of the braille cells 308. However, in alternative embodiments of the present disclosure, the second display area 312 may include one of the braille cells 308, or the second display area 312 may include more than two of the braille cells 308. In even further embodiments of the present disclosure, the second display area 312 may be a notification area that does not include any braille cells 308. The notification area may include, instead, a light or any other notifier that is known in the art. In this regard, the second display area 312 or the notification area may be displayed adjacent to or contiguous with the first display area 310. In further embodiments, the second display area 312 or the notification area may be set apart or distinguished from the first display area 310.

According to embodiments of the present disclosure, the braille display 300 may be preconfigured or manufactured to include the first display area 310 and the second display area 312 or notification area. In additional embodiments of the present disclosure, the braille display 300 may be preconfigured or manufactured to include only the display area 306, without distinguishing between the first display area 310 and the second display area 312. For example, the braille display 300 may be a traditional braille display 300 that includes a single row of contiguous and uniform braille cells 308.

According to embodiments of the computer-implemented method 200 in which the braille display 300 only includes the single display area 306 without distinguishing between the first display area 310 and the second display area 312, the computer-implemented method 200 may update firmware of the braille display 300 for allocating at least one of the braille cells 308 as the second display area 312 and defining others of the braille cells 308 as the first display area 310, as shown by S202 of FIG. 2.

In further embodiments of the computer-implemented method 200, the braille display 300 may be preconfigured or manufactured to include the second display area 312, and thus, it may not be necessary to update the firmware of the braille display 300. As such, the feature of updating the firmware of the braille display 300 for allocating at least one of the braille cells 308 as the second display area 312 and defining others of the braille cells 308 as the first display area 310 is shown as an optional feature at S202 in FIG. 2.

As shown at S204 in FIG. 2, the computer-implemented method 200 transmits, via an interface 304, content information of the application to the braille display 300 for displaying the content information by the braille display 300. In other words, as the application is being executed, content of the application is being transmitted to the braille display 300 such that a user of the braille display 300 may read the content in as much the same was as another user may visually view the content of the application.

The content information may comprise any information displayed within the application. For example, the content information may comprise textual information of a webpage or textual information of a document. The content information may further comprise graphical information or navigational information pertaining to the application. Of course, those skilled in the art appreciate that the above-described examples are merely exemplary and are not meant to be limiting. The content information may include any information which may be displayed by a braille display, as generally known and understood by those in the art.

The content information that is transmitted by the computer-implemented method 200 is configured to be displayed in the first display area 310 of the braille display 300. The content information may include a bit or a flag that is set for indicating that the information is the content information which is to be displayed in the first display area 310. In further embodiments of the present disclosure, the information may be determined to be the content information if the information is greater than or equal to a predetermined size. For example, it the first display area 310 includes a predetermined number of the braille cells 308 and the information includes a same number of characters or symbols as the number of the braille cells 308, the information may automatically be determined as being the content information. Of course, those skilled in the art appreciate that the content information may be designated as such in accordance with any known or understood method in the art.

The content information may be transmitted to the braille display 300 in accordance with any known or understood method in the art. For example, the content information may be transmitted to the braille display 300 in response to a request received from a user. In additional or alternative embodiments, the content information may be transmitted to the braille display 300 automatically in response to previous content information being read by a user. For example, the braille display 300 may be a continuous, scrolling display which continually updates the information displayed in the first display area 310. Various known and understood methods of transmitting the content information to the braille display 300 and displaying the content information by the first display area 310 may be employed by the present disclosure without departing from the scope of the present disclosure.

While the computer-implemented method 200 is transmitting the content information to the braille display 300 at S204, the computer-implemented method 200 is also monitoring for an event in the application. The event may be any live event or live update that occurs in the application. For example, if the application is a calendar application and a user creates a calendar event, the event may be a confirmation that the calendar event was saved successfully. In another exemplary embodiment, if the application is a word processing program which allows collaboration, the event may be a chat message received from a collaborating user. In other words, the event may be any live notification or update received or created by the application. Of course, those skilled in the art appreciate that the above-described examples of events or updates are merely exemplary and are not meant to be limiting or exhaustive.

Figure 4:
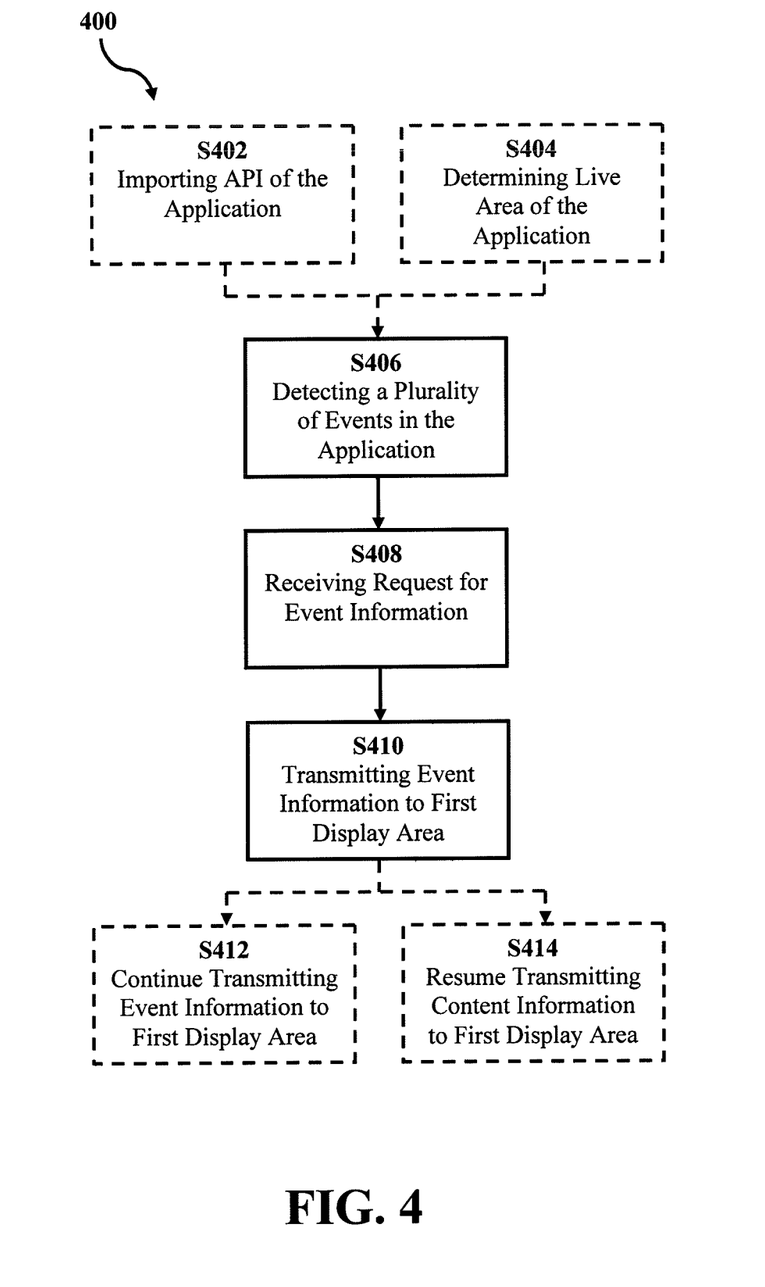
FIG. 4 illustrates an embodiment of a computer-implemented method for providing a notification of an event in an application to a braille display.

In an embodiment of the present disclosure as shown by FIG. 4, a computer-implemented method, generally shown at 400, may import or process an application programming interface 304 of the application at S402. The computer-implemented method 400 may than use the application programming interface 304 to monitor and react to events or updates in the application at S406.

In further embodiments of the present disclosure, also as shown in FIG. 4 at S404, the computer-implemented method 400 may use information of standards for monitoring and detecting the events and/or updates in the application. For example, the computer-implemented method 400 may use the Web Accessibility Initiative-Accessible Rich Internet Applications (WEB-ARIA) standard to determine "live regions" in the application. The computer-implemented method 400 may monitor the "live regions" to determine the events and/or updates in the application.

As shown in FIG. 2, when the event is detected in the application at S206, a notification of the event is transmitted to the braille display 300 device independently of the content information at S208. The notification of the event is configured to be displayed in the second display area 312 of the braille display 300. In this regard, the notification may be determined to be displayed in the second display area 312 in accordance with any of the methods in which the content information may be determined to be displayed in the first display area 310, or in accordance with any additional known or understood methods.

Since the notification is configured to be displayed in the second display area 312 independently of the content information, transmission and display of the notification of the event does not interrupt transmission of the content information, while still providing notification of the event. In other words, transmission of the notification of the event does not shift a focus from the content information, thereby interrupting a current work flow.

In some embodiments of the present disclosure, the notification of the event is a passive notification. For example, the notification may be a mere mechanical change in one of the braille cells 308 in the second display area 312, which is not accompanied by any sound and/or visual notification so as to ensure that a focus of a user of the braille display 300 is not affected or interrupted. In alternative embodiments of the present disclosure, the notification may be an active notification. For example, the notification may be accompanied by an audible sound, such as a ringtone, or a light. Of course, those skilled in the art appreciate that the above-described examples of an active notification, or accompaniment of an active notification, are merely exemplary and not limiting.

The notification of the event may be a generic notification in certain embodiments of the present disclosure. That is, the notification may not be representative or indicative of the event in any aspect, but rather, may merely indicate the existence of any event. In alternative embodiments, the notification may be representative or indicative of the event in the application. For example, the notification may be a character which corresponds to the event, such as a "c" for a chat request or a "s" for a save confirmation. In additional or alternative embodiments, different events may be associated with predetermined or user assigned characters or symbols. As such, the application may be customizable such that a user of the braille display 300 may quickly determine the type of event while minimizing the focus shifted from the content information of the application. Of course those skilled in the art appreciate that these example are merely exemplary.

As shown in FIG. 2, the computer-implemented method 200 may receive a request from the braille display 300 at S210 for event information of the event after the notification of the event is transmitted to the braille display 300. The request may be initiated by a user of the braille display 300 in accordance with any method or manner known and understood in the art. In alternative embodiments of the present disclosure, the request may be automatically initiated by the braille display 300. For example, in an embodiment of the present disclosure, the request for the event information of the event of the application may be automatically initiated in response to the transmission of the content information being inactive for a predetermined period of time. In additional embodiments of the present disclosure, the request for the event information of the event may be automatically initiated by the braille display 300 or the application when the application does not include any content information which has not yet been displayed by the braille display 300. In even further embodiments of the present disclosure, the request for the event information may be automatically initiated in response to a predetermined number of the event notifications being received by the braille display 300. In such embodiments, a number of the event notifications which may be stored by the braille display 300, the application, or the computer or computing device may be limited to a predetermined number. When the predetermined number of the events are detected and not viewed by a user of the braille display 300, the event information of the events may be automatically requested to be displayed.

While the request for the event information is not received from the braille display 300, the computer-implemented method 200 continues to transmit the content information to the first display area 310 of the braille display 300 as shown by S412 of FIG. 2. In the event that the request for the event information is received from the braille display 300, the computer-implemented method 200 transmits the event formation to the braille display 300 at S414. The event information that is transmitted to the braille display 300 is configured to be displayed by the braille display 300 in the first display area 310 of the braille display 300 while interrupting the transmission of the content information to the braille display 300. As a result, a user of the braille display 300 is able to determine a content or the event information of the event in the application when desired.

According to a non-limiting and exemplary embodiment of the present disclosure, a user of the braille display 300 may be working in a calendar application and may create a calendar event. After saving the calendar event, a visual notification is displayed by the application to inform the user that the event has been saved. However, a user of the braille display 300 may not be able to detect the visual application, thus discerning that the calendar event has been saved. As a result, using the application programming interface of the calendar application, any event in a live region of the application may be detected, which may then be represented by the notification in the second display area 312 on the braille display 300. Once the user checks the notification in the second display area 312 and the event information is transmitted to the first display area 310 of the braille display 300, the user can learn that the calendar event was saved successfully.

According to another non-limiting and exemplary embodiment of the present disclosure, a user of the braille display 300 may be working in a word processing application and writing text in a document. At the same time, a second user may be viewing the same document. The second user may send a chat message in a collaboration area of the word processing application. Rather than moving the focus of the user of the braille display 300 to the received chat message in the word processing document, the notification about the incoming chat message may be displayed in the second display area 312 of the braille display 300. Once the user of the braille display 300 has finished writing the text in the document, the user can then check the notification in the second display area 312 of the braille display to learn that there was a chat message, and, if desired, request that the event information corresponding to the notification be displayed in the first area 310 of the braille display 300 to learn the contents of the chat message. As a result, the focus of the user of the braille display 300 is not interrupted.

According to further embodiments of the present disclosure, as shown by FIG. 4, a computer-implemented method 400 may monitor and transmit a notification to the braille display 300 for each of a plurality of events detected in the application at S406. In this regard, event information for each of the plurality of events detected in the application at S406 may be stored in a queue. The queue may be a first-in-first-out queue, last-in-last-out queue, or any other queue commonly known and understood in the art. In this regard, according to an embodiment of the present disclosure, the notification for each of the plurality of events may indicate a number of the events that have been detected in the application and that are stored in the queue.

The computer-implemented method 400 may transmit a notification of each of the plurality of events to the braille display 300, and the notification of each of the events may be displayed in the second display area 312 of the braille display 300. If the computer-implemented method 400 receives a request from the braille display 300 for the event information of a first event of the plurality of events stored in the queue after transmitting the notification of the first event to the braille display 300 at 5408, the computer-implemented method 400 may then transmit the event information of the first event to the braille display 300, while interrupting the transmission of the content information to the braille display 300. The event information is configured to be displayed in the first display area 310 of the braille display 300.

According to an embodiment of the computer-implemented method 400, after the event information of the first event is transmitted to the braille display 300, event information of a second event of the plurality of events stored in the queue may be automatically transmitted to the braille display 300 at 5410 upon receiving any request from the braille display 300 for additional information. For example, when the braille display 300 requests additional information, such as after the user reads the current information displayed in the first display area 310, the computer-implemented method 400 continues to transmit event information of the plurality of events stored in the queue while interrupting the transmission of the content information to the braille display 300. In other words, if a user of the braille display 300 requests new information or if the braille display 300 is configured to automatically provide new information, the information that is provided to the braille display 300 is that of the event information of the next event of the application, and not the content information of the application. Said another way, the event information of the events stored in the queue is the default information to be displayed in the first area 310 of the braille display 300, and not the content information of the application.

According to an alternative embodiment of the computer-implemented method 400, transmission of the content information to the braille display 300 is resumed at S412 after transmitting the event information of the first event to the braille display 300. That is, if a user of the braille display 300 requests new information or if the braille display 300 is configured to automatically provide new information, the information is that of the content information of the application. In other words, the default information to be displayed in the first display area 310 of the braille display 300 is the content information of the application.

The present disclosure further provides for a server for providing a notification of an event in an application to a braille display 300. The server includes a processor, interface, memory, and receiver as generally described above with respect to FIG. 1. The processor is configured to detect an event in the application, and the interface is configured to transmit content information of the application to the braille display 300 for displaying the content information by the braille display 300, and transmit the notification of the event to the braille display 300 independently of the content information without interrupting transmission of the content information in response to the processor detecting the event for notifying of the event while displaying the content information by the braille display 300. The content information is configured to be displayed in a first display area 310 of the braille display 300, and the notification is configured to be displayed in a second display area 312 of the braille display 300 different than the first display area 310.

The memory is configured to store event information of the event in response to the processor detecting the event, and the receiver is configured to receive a request from the braille display 300 for the event information of the event after transmitting the notification of the event to the braille display 300. The interface is further configured to transmit the event information of the event to the braille display 300 while interrupting the transmission of the content information in response to the receiver receiving the request from the braille display 300 for the event information. The event information is configured to be displayed in the first display area 310 of the braille display 300.

While the present disclosure has generally been described above with respect to computer-implemented methods and a braille display, those skilled in the art, of course, appreciate that the various features and embodiments of the above-described computer-implemented methods 200, 400 and braille display 300 may be incorporated into the above-described server without departing from the scope of the present disclosure. Moreover, those skilled in the art appreciate that the various features and embodiments of the above-described computer-implemented methods 200, 400 and braille display 300 may be implemented as a non-transitory computer-readable medium, program, or code segment which are executable for causing a server, computer, or system to operate in accordance with the above-described methods 200, 400 and display 300.

Accordingly, the present disclosure provides various systems, servers, methods, media, and programs for generating a graphical comparison of data files. Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials and embodiments, the present disclosure is not intended to be limited to the particulars disclosed; rather the present disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method for providing event notification to braille displays, the computer-implemented method comprising:
   transmitting, using one or more computing devices, content information of an application to a braille display for displaying the content information by one or more braille cells in a first display area of the braille display;
   detecting, using the one or more computing devices, an event in the application;
   transmitting, in response to the detecting and using the one or more computing devices, a notification of the event to the braille display device independently of the content information for display by one or more braille cells in a second display area of the braille display while displaying the content information in the first display area of the braille display;
   receiving, from the braille display after the notification is transmitted, a request for event information associated with the event, the request for event information being automatically initiated by the braille display in response to a transmission of the content information being inactive for a predetermined period of time; and
   transmitting the requested event information to the braille display for display in the first content area at least in part based on receiving the request for the event information from the braille display.

2. The computer-implemented method according to claim 1, further comprising:
   transmitting the notification to the braille display for each of a plurality of events detected in the application; and
   storing event information of each of the plurality of events detected in the application in a queue.

3. The computer-implemented method according to claim 2, further comprising:
   receiving a request from the braille display for the event information of a first event of the plurality of events stored in the queue after transmitting the notification of the first event to the braille display;
   transmitting the event information of the first event to the braille display while interrupting the transmission of the content information in response to receiving the request from the braille display for the event information of the first event, the event information being configured to be displayed by the braille display in the first display area of the braille display; and
   automatically transmitting the event information of a second event of the plurality of events stored in the queue to the braille display while interrupting the transmission of the content information after transmitting the event information of the first event to the braille display.

4. The computer-implemented method according to claim 2, further comprising:

receiving a request from the braille display for the event information of a first event of the plurality of events stored in the queue after transmitting the notification of the first event to the braille display;

transmitting the event information of the first event to the braille display while interrupting the transmission of the content information in response to receiving the request from the braille display for the event information of the first event, the event information being configured to be displayed by the braille display in the first display area of the braille display; and resuming the transmission of the content information to the braille display after transmitting the event information of the first event to the braille display.

5. The computer-implemented method according to claim 1, wherein the notification is representative of the event.

6. The computer-implemented method according to claim 1, wherein the notification is configured to be passively displayed by the braille display.

7. The computer-implemented method according to claim 1,
wherein the application includes at least one live region, and
the event is detected as an update in the at least one live region.

8. A system, comprising:
a processor;
a braille display operably connected to the processor, wherein the braille display comprises a first display area of one or more braille cells and a second display area of one or more braille cells; and
a non-transitory computer-readable medium including an executable program that, when executed by the processor, provide a notification of an event in an application to a braille display, the executable program causing a computer to execute:
transmitting content information of the application to the first display area of the braille display;
detecting the event in the application;
transmitting, in response to detecting the event, the notification of the event to the second display area of the braille display independently of the content information while displaying the content information by the first display area of the braille display;
receiving, from the braille display after the notification is transmitted, a request for event information associated with the event, the request for event information being automatically initiated by the braille display in response to a transmission of the content information being inactive for a predetermined period of time; and
transmitting the event information of the event to the to the first area of the braille display at least in part based on receiving the request for the event information.

9. The non-transitory computer-readable medium according to claim 8,
wherein the braille display comprises a plurality of braille cells and the executable program further causes the computer to execute:
updating firmware of the braille display for allocating at least one of the plurality of braille cells as the second display area and defining others of the plurality of braille cells as the first display area.

10. The non-transitory computer-readable medium according to claim 8,
wherein the executable program further causes the computer to execute:

importing an application programming interface of the application,
wherein the event in the application is detected based on the application programming interface.

11. A system for providing a notification of an event in an application to a braille display, the system comprising:
a server comprising one more processors; and
a braille display, wherein the braille display comprises a first display area of one or more braille cells and a second display area of one or more braille cells, wherein the server is configured to:
transmit content information of the application to the braille display for displaying the content information by the braille display, the content information configured to be displayed in the first display area of the braille display;
detect the event in the application; and
transmit, in response to detecting the event, the notification of the event to the second area of the braille display device independently of the content information while the content information is displayed in the first display area of the braille display, the notification configured to be displayed in the second display area of the braille display different than the first display area; and
receive, from the braille display after the notification is transmitted, a request for event information associated with the event, the request for event information being automatically initiated by the braille display in response to a transmission of the content information being inactive for a predetermined period of time,
transmit the event information to the braille display at least in part based on receiving the request for the event information, the event information configured to be displayed in the first display area of the braille display.

12. The server according to claim 11, further comprising:
a memory configured to store event information of the event in response to the processor detecting the event.

13. A braille display device for providing a notification of an event in an application, comprising:
a processor;
a memory, the memory including instructions that, when executed by the processor, detect an occurrence of the event in the application and transmit the notification of the event to an interface;
an interface configured to receive content information of the application and the notification of the event in the application;
a first display area comprising a plurality of braille cells and configured to display the content information of the application; and
a second display area comprising at least one braille cell and configured to display the notification of the event in the application,
wherein the second display area of the braille display is configured to display the notification of the event independently of the content information while the content information is displayed by the first area of the braille display,
wherein the interface is configured to automatically transmit a request for event information of the event in response to a transmission of the content information being inactive for a predetermined period of time, after the notification is received, and to transmit the event information to the first display area of the braille display when the event information is received.

* * * * *